United States Patent [19]

Onufry

[11] Patent Number: 4,579,426
[45] Date of Patent: Apr. 1, 1986

[54] VARIABLE TRANSPARENCY WINDOW

[76] Inventor: Daniel G. Onufry, 2175 Rollins, Flint, Mich. 48507

[21] Appl. No.: 185,265

[22] Filed: Sep. 8, 1980

Related U.S. Application Data

[63] Continuation of Ser. No. 954,346, Oct. 25, 1978.

[51] Int. Cl.$^4$ .............................................. G02B 5/30
[52] U.S. Cl. ................................................... 350/407
[58] Field of Search ........................................ 350/407

[56] References Cited

U.S. PATENT DOCUMENTS

| | | | |
|---|---|---|---|
| 2,423,321 | 7/1947 | Hurley | 350/407 |
| 2,565,362 | 8/1951 | Eloranta | 350/407 |
| 3,368,652 | 2/1968 | Klatchko | 350/407 |
| 3,521,300 | 7/1970 | Weiss | 350/407 |

Primary Examiner—R. A. Rosenberger
Attorney, Agent, or Firm—Hauke and Patalidis

[57] ABSTRACT

A variable transparency window assembly comprising a plurality of polarizing window elements, the first and second of said elements being fixedly secured to supporting structure with their respective principal axes of polarization mutually aligned and a third of said elements being located intermediate said first and second elements in axially spaced relation thereto and being mounted for rotation with respect to the first and second polarizing elements. The third and rotatable element may be manually or motor driven, and in the latter instance this element may be secured to a partially toothed or geared ring member actuated for rotation through a limited arc under control of connecting motor and gear means, limit means and actuating cam means and a three-position electric switch means. By this novel arrangement, among other advantages, the amount of light transmitted by the polarizing window assembly is more accurately controlled, and complete extinction is provided at the extreme rotative position of the rotatable polarizing element, wherein the principal axis of polarization of the rotatable polarizing element is substantially at right angle to the aligned principal axes of polarization of the stationary polarizing elements.

3 Claims, 6 Drawing Figures

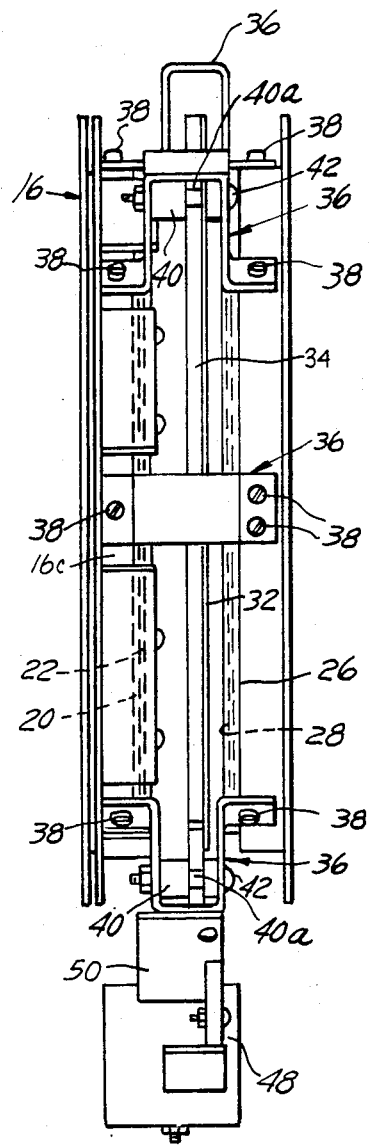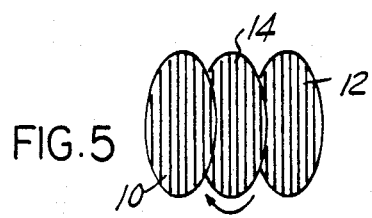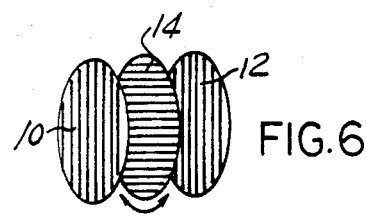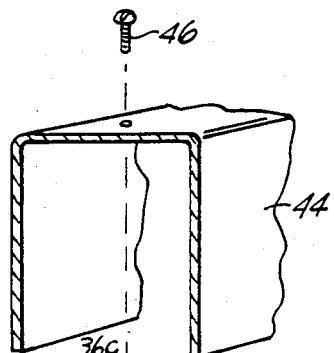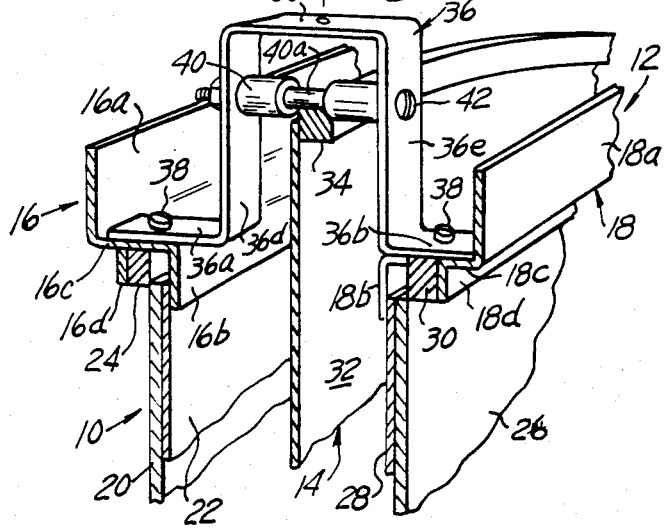

VARIABLE TRANSPARENCY WINDOW

This is a continuation of application Ser. No. 954,346, filed Oct. 25, 1978.

BACKGROUND OF THE INVENTION

It is known in the art to which this invention pertains to provide a variable density window comprising a pair of overlying light-polarizing elements wherein one of the light-polarizing elements is fixedly positioned and the other element is rotatable with respect thereto. Generally representing the prior art is U.S. Pat. No. 2,311,840 issued Feb. 23, 1943 in the name of Edwin H. Land. In the Land patent, hand-operated crank means are provided to drive the rotatable light-polarizing element. However, in such references as U.S. Pat. No. 3,521,300 dated July 21, 1970, a drive roller controlled by electrically energized motor means is also suggested in order to effect rotation of the movable light-polarizing element.

It has been observed that when using only a pair of polarizing elements, one stationary and the other rotatable, although almost complete extinction of the light transmitted by the variable density window is effected when the principal axes of polarization of the elements are at right angles to each other, it is still possible for an observer situated on one side of the window to see an object disposed on the other side, especially if viewing of the object is effected at an angle to the parallel planes of the polarizing elements. Such inconveniences and shortcomings of the prior art are completely eliminated by the structure of this invention utilizing a pair of spaced-apart stationary polarizing elements having their principal axes of polarization aligned, and placing the rotatable polarizing element between the stationary elements and spaced therefrom.

SUMMARY OF THE PRESENT INVENTION

The instant invention is directed to a polarizing window assembly which features a plurality of polarizing window elements, a pair of these elements being axially spaced from one another, with their principal axes of polarization mutually aligned, and fixedly secured to suitable supporting structure, which may be an aircraft cabin wall, a van body wall, or the like. There is also provided a spaced apart third polarizing window element which is located intermediate and therefore in relatively closer proximity to the first and second elements, but still substantially relatively far therefrom, and which is mounted for rotation with respect thereto. By provision of three elements constructed and arranged in the manner to be more fully disclosed hereinafter, much more accurate control is achieved in the amount of light transmitted by the polarizing window assembly and complete opacity is achieved when the rotatable polarizing window is rotated such that its principal axis of polarization is disposed at a right angle to the aligned principal axes of polarization of the stationary polarizing windows.

The third and rotatable element may be manually or motor driven, and when motor means are utilized, the third element is secured to a partially toothed or geared ring member actuated for rotation through a limited arc by means of a relatively simple mechanism which includes gear means cooperating with the motor means, a plurality of limit switches and associated cam means, and a three-position electric switch means. By so proceeding, there is achieved a better light control, the entire assembly has a minimum number of parts and can be quickly installed in any window opening, and versatility of use is accomplished by having the rotatable light-polarizing element actuated either manually or electrically.

The invention also achieves improved passenger comfort, psychological well-being, and convenience, as well as relieving maintenance conditions by elimination of shades, drapes, curtains and the like.

BRIEF DESCRIPTION OF THE DRAWINGS

FIG. 2 is a fragmentary vertical sectional view taken substantially along the line 2—2 of FIG. 1;

FIG. 4 is an end view to more fully illustrate certain portions of the assembly of this invention; and FIGS. 5 and 6 are schematic views useful in explaining the operation of the invention.

DETAILED DESCRIPTION OF THE PREFERRED EMBODIMENTS

Figure 1:
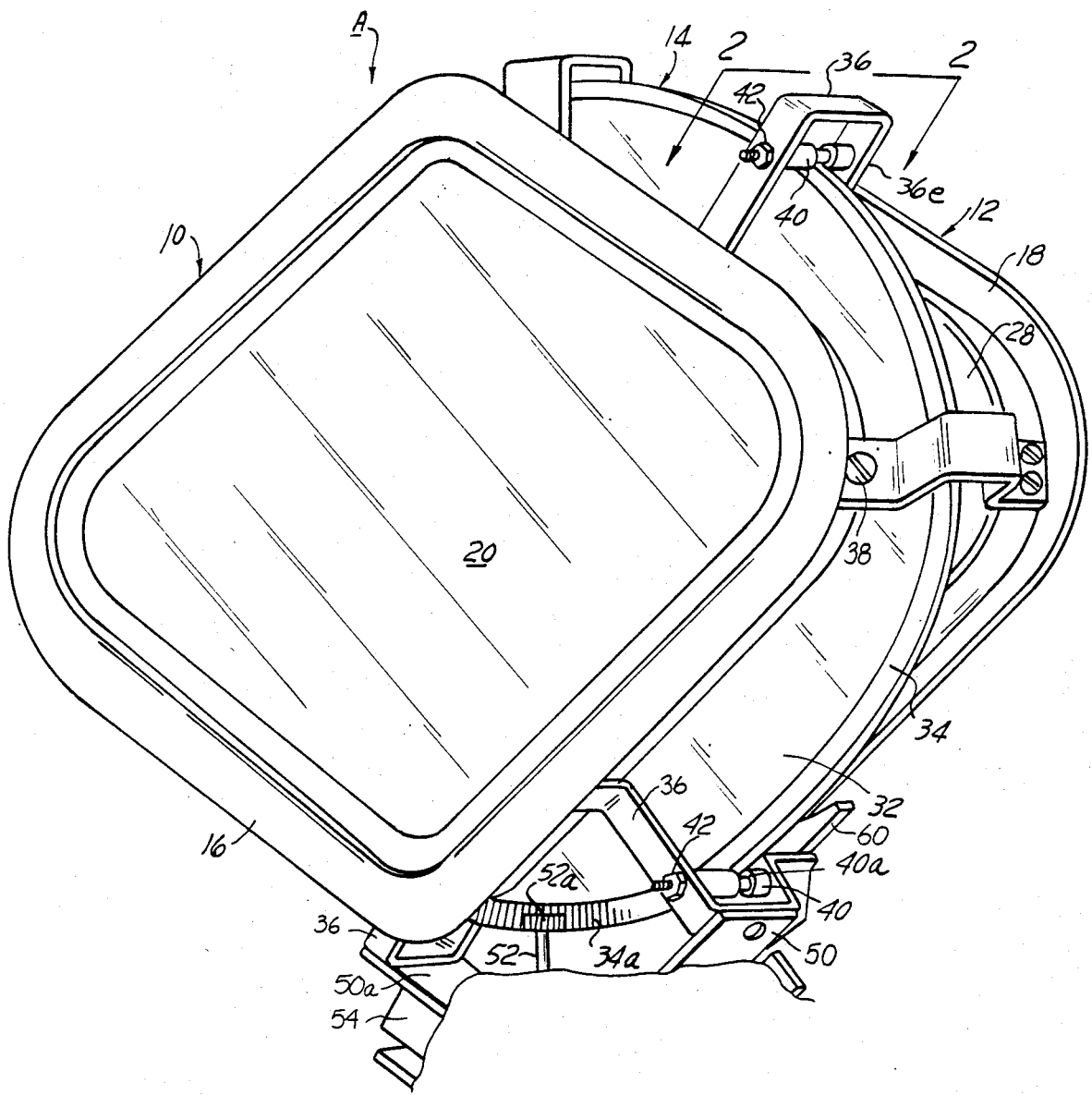
FIG. 1 is a perspective view of the light polarizing window assembly of this invention.

Referring now to the drawings, there is shown a variable transparency window assembly generally designated by the legend A and which comprises a plurality of polarizing window elements, a first element being indicated in the drawings by the numeral 10. a second polarizing element at 12, and a third and intermediate polarizing element generally designated by the numeral 14.

Referring now also to FIGS. 2 and 4, the first polarizing element 10 is constructed to include an outer window frame member 16 shaped to include an upstanding wall section 16a and a downwardly directed wall section 16b connected by a lateral wall section 16c. Constructed in a similar manner there is provided in the polarizing window 12 an inner window frame member 18 having an upstanding wall section 18a, a downwardly directed wall section 18b and a lateral connecting wall section 18c. It may further be seen from FIG. 2 that the outer window frame members 16 and 18 further include downwardly dependent leg sections 16d and 18d, respectively.

The first polarizing element 10 incorporates therein an outer glass or plastic pane 20 to which is adhesively or otherwise secured an outer light polarizing pane 22. The assembly thus formed is held in position by elastomeric seal or gasket means 24 which wedges the outer pane structure against the dependent frame wall section 16d. The pane members 20 and 22 can be of any desired shape, and, as shown, are substantially rectangular. In any event, seal member 24 extends entirely around the periphery or circumference of the pane members 20 and 22 to effect cushioning and to prevent the ingress of undesired elements.

In like manner, the polarizing element 12 incorporates therein an inner glass or plastic pane 26 to which is secured an inner light polarizing pane 28, the two panes being held between the window frame member leg portions 18b and 18d by elastomeric seal means 30. As with the outer polarizing window element 10, the inner polarizing element 12 may be circular or rectangular or of any other desired shape.

A significant aspect of the instant invention is, as was earlier noted, the provision of a third polarizing element 14 in combination with two other polarizing elements 10 and 12 and in which the third element is disposed between the two other elements in axially spaced relationship with respect thereto at a substantial distance from the two other elements, as best shown at FIGS. 1, 2 and 4. The third polarizing element 14 comprises a glass or plastic polarizing plate 32 which is preferably circular in shape and has secured along its circumference a ring member 34 toothed or geared as at 34a, FIG. 1, along an arc extending over at least 90° of the circumference of the ring member. A plurality of generally U-shaped guide and bearing means 36 are provided for the ring member 34, and as is best seen in FIG. 2, the outwardly directed tab means 36a and 36b are attached to the outer frame members 16 and inner frame members 18 by fastening means 38.

The guide means 36 is further shaped to include a roof portion 36c which connects with the tab portions 36a and 36b through leg portions 36d and 36e. The leg portions 36d and 36e on the guide means are suitably apertured to receive opposite ends of a ring guide roller 40 having a central reduced diameter portion 40a. Fastening means 40 serve to attach the ring guide roller 42 to the upstanding leg portions 36d and 36e of the guide means 36. For protective reasons a generally U-shaped plastic or metal cover 44 seats upon the guide means 36 and is attached thereto by a screw means or the like 46, shown in the drawing only in FIG. 2.

In order to effect rotative movement of the central polarizing window element 14 with respect to the polarizing elements 10 and 12, there is provided electric motor means 48 secured by bracket means 50 to a fixed structure forming a part of the aircraft cabin or related stationary environment or, as shown in the drawing at 50a to the roof portion 36c of adjacent guide means 36. The motor means 48 mounts a stub shaft 52 having a toothed or geared head portion 52a which meshes with the geared portion 34a on the ring member 34.

Figure 3:
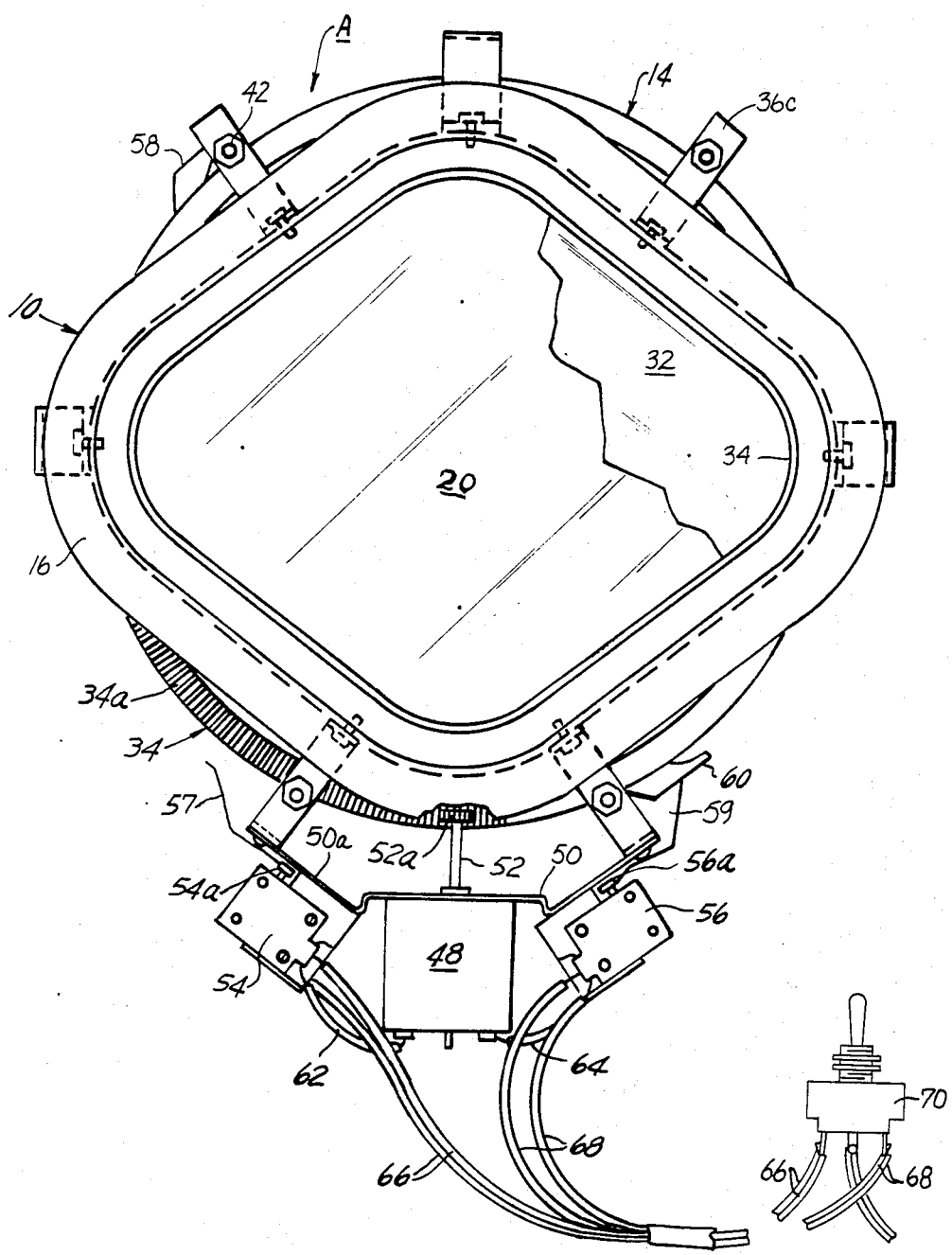
FIG. 3 is a side elevational view of the assembly of FIG. 1.

The motor means mounting bracket 50 may also have suitably affixed thereto limit switches 54, shown in FIGS. 1 and 3, and 56, shown in FIG. 3 only, each of which is equipped with contact portions 54a and 56a which through cam followers 57 and 53 intermittently contact limit switch actuating cams 58 and 60, respectively, engageable with the ring member 34 forming a part of the third polarizing element 14 to control the extent of radial movement thereof.

Connecting the limit switch 54 to the motor 48 is a lead 62 and a lead 64 also runs from the limit switch 56 to the same motor 48. A pair of leads 66 and 68 connect the limit switches 54 and 56, respectively, to toggle switch means 70. This particular switch is a three-position switch having on-off-on stops to control the direction and extent of rotary movement of the third polarizing element 14.

The operation of the variable transparency window assembly of this invention is believed to be manifest from the foregoing description of the structural details thereof. A person desirous of controlling the extent of light transparency through the window assembly A need only actuate the toggle switch 70 to the appropriate "on" position which controls the motor means 48 to rotate the central polarizing element 14 through a total arc of 90° from full transparency of the window assembly A to complete opacity, or in a reverse direction. Any intermediate position is obtained by releasing the toggle switch 70 to the "off" position. In other words, at one extent of the arc there is achieved maximum transparency, FIG. 5, when the principal axes of polarization of all three polarizing elements 10, 12 and 14 are aligned and at the other end of the arc minimum transparency is achieved, FIG. 6, when the principal axis of polarization of the rotatable polarizing element 14 is disposed at a right angle to the principal axes of polarization of the stationary polarizing elements 10 and 12. At other intermediate locations on the arc, by control of the toggle switch 70 and associated mechanisms, varying degrees of transparency can be readily obtained.

The toothed sector 34a of the ring member 34 extends over an arc of more than 90°, for example, it extends over an arc of 110°. This arrangement provides a tolerance of ±10° at both ends of the 90° arc of rotation of the rotatable element 14 which permits to calibrate the limits of that arc by adjustably presetting the position of the cams 58 and 60 on the ring member 34 and/or the positions of the limit switches 54 and 56.

The material which provides a polarizing function for the elements 22, 28 and 32 is of course well known to the art and is available under the trademark "Polaroid". A more specific description of this material is contained in U.S. Pat. No. 2,311,840, previously referred to, and also in subsequently published literature.

It is believed apparent from the foregoing that various changes and modifications may be made in the structures disclosed without departing from the spirit of the invention or the scope of the subjoined claims.

I claim:

1. A polarizing window assembly for installing as a single unitary assembly in an opening in a vehicle body, said unitary assembly consisting of three polarizing elements each having a principal axis of polarization, the first and the second of said polarizing elements being non-circular and fixedly disposed in axially spaced apart relationship with respect to one another, the principal axes of polarization of said first and second polarizing elements being mutually aligned and the third of said polarizing elements being circular and rotatably positioned between said first and second polarizing elements in axially spaced apart relationship with respect to each of said first and second polarizing elements, driving means connected to said third polarizing element to effect controllable rotation of said third polarizing element relative to the first and second polarizing elements from a first position whereby the principal axis of polarization of said third polarizing element is aligned with the principal axes of said first and second polarizing elements to a second position whereby the principal axis of said third polarizing element is 90° from said first position for effecting a variance in the amount of light transmitted through said first, second and third polarizing elements from full amount to extinction, a ring member fixedly mounted on the periphery of said third rotatable polarizing element, a stationary frame fixedly supporting said first and second polarizing elements and rotatably supporting said ring mounted on the periphery of said third polarizing element, wherein said frame comprises a first window frame member and a second window frame member fixedly supporting respectively said first polarizing element and said second polarizing element, each of said window frame members further supporting an outer transparent window pane disposed on one side of said polarizing element supported by each of said window frame members, a plurality of brackets interconnecting said first and second window frame members and disposed around the periphery of said ring member mounted on the periphery of said third polarizing element, and bearing means depending from at least three of said brackets rotatably supporting said ring member, each of said bearing means comprising a roller having a reduced central diameter portion engaging the periphery of said ring member and a pair of symmetrically disposed lateral enlarged diameter portions each engaging a portion of a side of said ring member, and wherein said driving means for said rotatable third polarizing element comprises gear teeth formed on a side of said ring member and a reversible electric motor supported by said stationary frame such that said electric motor extends radially from said stationary frame and is disposed between planes defined by said window frame members, said electric motor having an output shaft, a pinion on said electric motor output shaft meshing with said gear teeth on the side of said ring member for rotatably driving said ring member and said third polarizing element in unison, a pair of limit switches mounted on said frame member at an arcuate distance of about 90°, and a cam affixed to said ring member for actuating said limit switches for limiting the rotation of said ring member and associated third polarizing element substantially over a 90° arc, wherein said gear teeth formed on one side of said ring member extend over an arc of about 110° and said limit switches are adjustable for limiting the rotation of said ring member and associated third polarizing element over a 90° arc from said first position wherein a full amount of light is transmitted through said three polarizing elements to said second position causing extinction of said light, and remotely installed manually operable switch means for activating said electric motor by connecting said electric motor across an electrical power source and for controlling the direction of rotation of said electric motor.

2. The polarizing window unitary assembly of claim 1 wherein said outer transparent window pane is made of glass.

3. The polarizing window unitary assembly of claim 1 wherein said outer transparent window pane is made of transparent plastic.

* * * * *